United States Patent [19]

Forsen et al.

[11] 4,107,537
[45] Aug. 15, 1978

[54] MULTIPLE PARTICLE TYPE INTERACTION ISOTOPICALLY SELECTIVE IONIZATION

[75] Inventors: Harold K. Forsen, Bellevue, Wash.; George Sargent Janes, Lincoln; Richard H. Levy, Boston, both of Mass.

[73] Assignee: Jersey Nuclear-Avco Isotopes, Inc., Bellevue, Wash.

[21] Appl. No.: 731,587

[22] Filed: Oct. 12, 1976

Related U.S. Application Data

[63] Continuation of Ser. No. 469,407, May 13, 1974, abandoned.

[51] Int. Cl.² .................................... H01J 39/34
[52] U.S. Cl. .................. 250/423 P; 250/281
[58] Field of Search ............ 250/423 P, 281, 282, 250/288

[56] References Cited

U.S. PATENT DOCUMENTS

| | | | |
|---|---|---|---|
| 3,294,970 | 12/1966 | Jenckel | 250/423 P |
| 3,772,519 | 11/1973 | Levy et al. | 250/287 |
| 3,944,825 | 3/1976 | Levy et al. | 250/423 P |
| 4,000,420 | 12/1976 | Harris | 250/423 P |

FOREIGN PATENT DOCUMENTS 2,312,194  10/1973  Fed. Rep. of Germany ........... 250/288

OTHER PUBLICATIONS

"Plasma Ionization Enhancement by Laser Line Radiation" Oettinger et al., AIAA Jour., vol. 8, No. 5, pp. 880–885, May 1970.
"Proposed New Method for Separating Isotopes", Stangeby et al., Nature vol. 233, Oct. 1971, pp. 472–473.

*Primary Examiner*—Bruce C. Anderson
*Attorney, Agent, or Firm*—Weingarten, Maxham & Schurgin

[57] ABSTRACT

Method and apparatus for impact ionization of particles excited with isotopic selectivity, particularly for use in a system of uranium isotope separation and enrichment. Efficient impact ionization is achieved by first selectively exciting vaporized particles of the desired isotope in a beam of finely tuned laser radiant energy. The energies of the interacting photons are selected to produce a total energy shift during excitation which is slightly less than the ionization energy for the selected isotope. The excited isotope will thus be raised to an excitation level only slightly below the ionization level. This level is selected to permit efficient ionization, particle collisional ionization, between energetic particles in the uranium vapor environment and the highly excited particles of the desired isotope type.

39 Claims, 3 Drawing Figures

MULTIPLE PARTICLE TYPE INTERACTION ISOTOPICALLY SELECTIVE IONIZATION

This is a continuation, of application Ser. No. 469,407, filed May 13, 1974 abandoned.

FIELD OF THE INVENTION

The present invention relates to isotope separation and in particular to isotopically selective ionization of particles employing impact or collisional ionization from excited states.

BACKGROUND OF THE INVENTION

In a system for laser induced isotope separation, particularly uranium enrichment, as described in U.S. Pat. No. 3,772,519, and specifically incorporated herein by reference, a system for isotope separation is described which achieves photoionization of a selected uranium isotope type in a vapor of uranium without corresponding ionization of particles of other isotope types in the vapor. The photoionized particles are then separated and collected apart from the environment of uranium vapor created for laser illumination.

The practice of such a system will typically be carried out with two or three wavelengths of laser radiation. At least one wavelength will be narrow band photons tuned to produce excitation of, for example, the uranium U-235 isotope without corresponding excitation of the U-238 isotope in the vapor. The other laser radiant energy is of a frequency or frequencies which produce photoionzation of the U-235 isotope from the highest excited state.

In determining how much laser intensity is employed to produce both isotopically selective photoexcitation, as well as photoionization from the excited state, the interaction cross-section of the atoms of the desired isotope type for each energy step is particularly significant. The larger the cross-section for a given energy step, the higher is the quantity of atoms excited through that energy step for the same incident laser intensity. As a general principle, the cross-section for an energy step between discrete energy levels, each of which is below the ionization level for the atom, is substantially larger, typically by two or three orders of magnitude, than the absorption cross-section for an energy step into the ionization continuum from an energy level below ionization. Because of this phenomenon of different absorption cross-sections, it is desirable to employ a laser intensity for the ionizing transition or energy step which is substantially higher in intensity than that for the excitation lasers. This is particularly significant for efficient, production level isotope separation or uranium enrichment. The increased intensity for the ionization step radiation not only places a corresponding demand upon the ionization laser system, but also increases the probability of unselective photoionization resulting from plural excitations by the high intensity ionizing laser radiation.

It is apparent then that it would be desirable to provide for isotopically selective ionization without such different laser intensity requirements.

BRIEF SUMMARY OF THE INVENTION

In accordance with a preferred embodiment of the present invention, a method and apparatus are provided for inducing high efficiency particle collisional ionization of excited particles of one isotope type in an environment of particles of plural isotope types. The isotopically selective ionization is achieved in preferred application for enrichment of uranium, typically the U-235 isotope, by exciting the U-235 particles to an energy level only slightly below the ionization level and employing particle collisional ionization to achieve ions of the desired, U-235, isotope type.

In practicing the invention, an environment comprising a beam of flowing uranium vapor is preferably created by, for example, heating of elemental uranium in a vacuum chamber of very low pressure. Pulses of laser radiant energy comprising, typically two, or three, frequencies are applied to the environment of uranium vapor in order to excite the desired, U-235, isotope. For this purpose, at least one laser wavelength is finely tuned, and confined in bandwidth so as to excite the U-235 isotope without exciting corresponding porportions of other isotope type particles in the uranium vapor flow. Plural energy steps may be employed to go from the ground, and/or significantly populated low lying energy levels, to a final, excited energy state just below the ionization continuum. The photons which interact to produce selective excitation of each uranium atom total in energy to a figure which is slightly below the ionization potential for the atoms. Preferably, this energy will be such as to raise the atom to a Rydberg level.

The cross-sections for each energy step up to the Rydberg level are desired to be very large. The final Rydberg energy state, just below the continuum, will be sufficiently close to the ionization level so that energy transferred to the highly excited U-235 particles by collision with energetic background particles, such as electrons in the uranium vapor beam, will produce significant rates of ionization of the particles from this highly excited energy state.

Isotopically selective ionization of the desired uranium isotope in accordance with this technique is highly efficient and avoids the need, from an efficiency standpoint, for high intensity radiation for the final, photoionizing step to overcome the relatively reduced cross-section for photon absorption in the transition into the continuum. Additionally, one laser system may be eliminated, and, instead, existing energy in the uranium vapor beam is utilized.

BRIEF DESCRIPTION OF THE DRAWINGS

These and other features of the present invention are more fully set forth below in the detailed description of the preferred embodiment for the present invention and in the accompanying drawings of which.

DETAILED DESCRIPTION OF THE PREFERRED EMBODIMENT

The present invention contemplates the use of particle collisions for achieving ionization of particles from highly excited energy states which have been populated in an isotopically selective manner. While the preferred embodiment relates to the ionization of uranium in atomic form from excited energy states created by laser radiation, the invention may have utility with any element in molecular or atomic form as well as in the context of other techniques for achieving highly excited energy states for the particles of the chosen isotope type.

According to the present invention ionization of the particles of the desired isotope type is achieved from the highly excited energy state by impact ionization or electron impact ionization. According to this technique, particles are excited to an energy level typically a Rydberg level by interaction with laser photons whose total energy is only a few hundreths of an electron volt below the ionization potential. Only a small additional energy is required to achieve ionization. This energy is provided by kinetic energy transfer pursuant to collisions between the highly excited particles and other, energetic, particles in the environment. This phenomenon is, for example, alluded to in "Nature", Volume 233, Oct. 15, 1971, where it was suggested (pp. 472,3) that it may have been observed in a mercury double discharge vessel. Also, mention of collisional ionization may be found in P. E. Oettinger, *Plasma Ionization Enhancement by Laser Line Radiation;* "AIAA JOURNAL", Volume 8, No. 5, May 1970.

Figure 1:
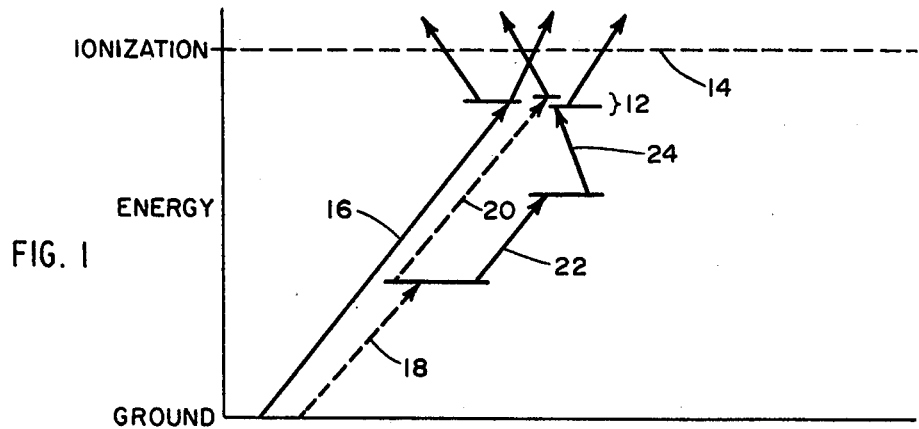
FIG. 1 is an energy level diagram useful in explaining the physical phenomenon associated with practicing the present invention.

To further explain this invention, reference is made to FIG. 1 where there is shown an energy level diagram describing the operation of the present invention. In FIG. 1, there is shown a range of energy 12 for a particle, which in the preferred embodiment is an atom of the uranium U-235 isootpe. The energy levels 12 are very close to the ionization level 14 for the U235 atom and preferably are Rydberg levels. Levels 12 are below the ionization potential 14 by a small energy deficit, for example 0.03 electron volts (ev). In the case of uranium the ionization level 14 is believed to be at approximately 6.19 ev. and thus levels 12 would be approximately 6.16 ev. While selected, the energy levels 12 may possibly be reached through a single energy step such as a transition 16, its proximity to the ionization level 14 for preferred operation (typically 0.03 ev) may necessitate selection of a more selective transition. Accordingly, a plurality of energy steps such as transitions 18 and 20, or 18, 22 and 24 are preferred. In the preferred embodiment, the one or more energy steps to the level 12 will be typically induced by laser radiation which is tuned for isotopic selectivity in at least the first step 18. A substantially greater proportion of the U-235 particles are excited in response to the laser radiation for that step than the proportion of excitation of other isotope type particles to which the radiation is applied in reference to the normally occurring proportions between the isotopes in the environment.

It is to be noted that many combinations of photoexcitation steps may be employed to reach the energy states 12, and indeed the technique of the present invention is not necessarily limited to the use of radiant energy to produce the selective excitation. The energy levels 12 which are below the ionization level 14 by a relatively small energy difference, exemplified by the 0.03 ev mentioned above, are shown as plural, closely spaced levels since parity considerations prevent reaching the same excited state by different transition combinations. Also, the atoms excited to states 12 may undergo one or more shifts through the range of states before ionization as described below.

The selection of the several energy steps leading to one of the levels 12 and accordingly of that level itself is more fully discussed below, but for the present certain considerations should be indicated. First, it is desired that the transition leading to the energy level in range 12 has a relatively large cross-section in order to make efficient use of the laser radiations. Generally, the cross-section for excitation to levels in range 12 decreases as the levels in range 12 approach level 14. At the same time, it is desired that the cross-section or probability for electron, or other particle, impact ionization of U-235 particles excited to the level 12 not be so small as to impair the separation efficiency of the overall system to be described below. This typically necessitates placing levels 12 close to the ionization level 14 and very preferably at a Rydberg level.

In making this trade-off, it may be useful to review the size of these cross-sections. In the case of excitation to the energy levels 12 from a lower lying energy, the cross-section is typically in the range of $10^{-15} cm^2$. In the case of electron particle collisional impact ionization, the cross-section is given as:

$$\text{Ton} = \frac{\pi v_0^2 \ln \frac{E}{I^*}}{\left(\frac{E}{I}\right)\left(\frac{I^\#}{I}\right)}$$

where $\gamma_o$ is the Bohr radius, approximately $0.53 \times 10^{-8}$ cm; I is the ionization potential for the hydrogen atom, approximately 13.5v; I* is the ionization potential from the excited state for the atom being excited; and E is the energy of the free, impacting electron.

Other factors may affect this trade-off including chamber environmental gas pressures, uranium vapor density, vapor flow rate and the decay rate from the levels 12. Typical ranges for these are shown below.

When these criteria have been optimized, the overall efficiency of ionization of the system will be high, and the technique of the present invention employed to maximum advantage. Whether or not the operation of the invention is maximized in accordance with theory, the phenomenon of particle impact ionization may still be of utility in achieving isotopically selective ionization, particularly ionization of the U-235 isotope of uranium to permit its separate collection.

Figure 2:
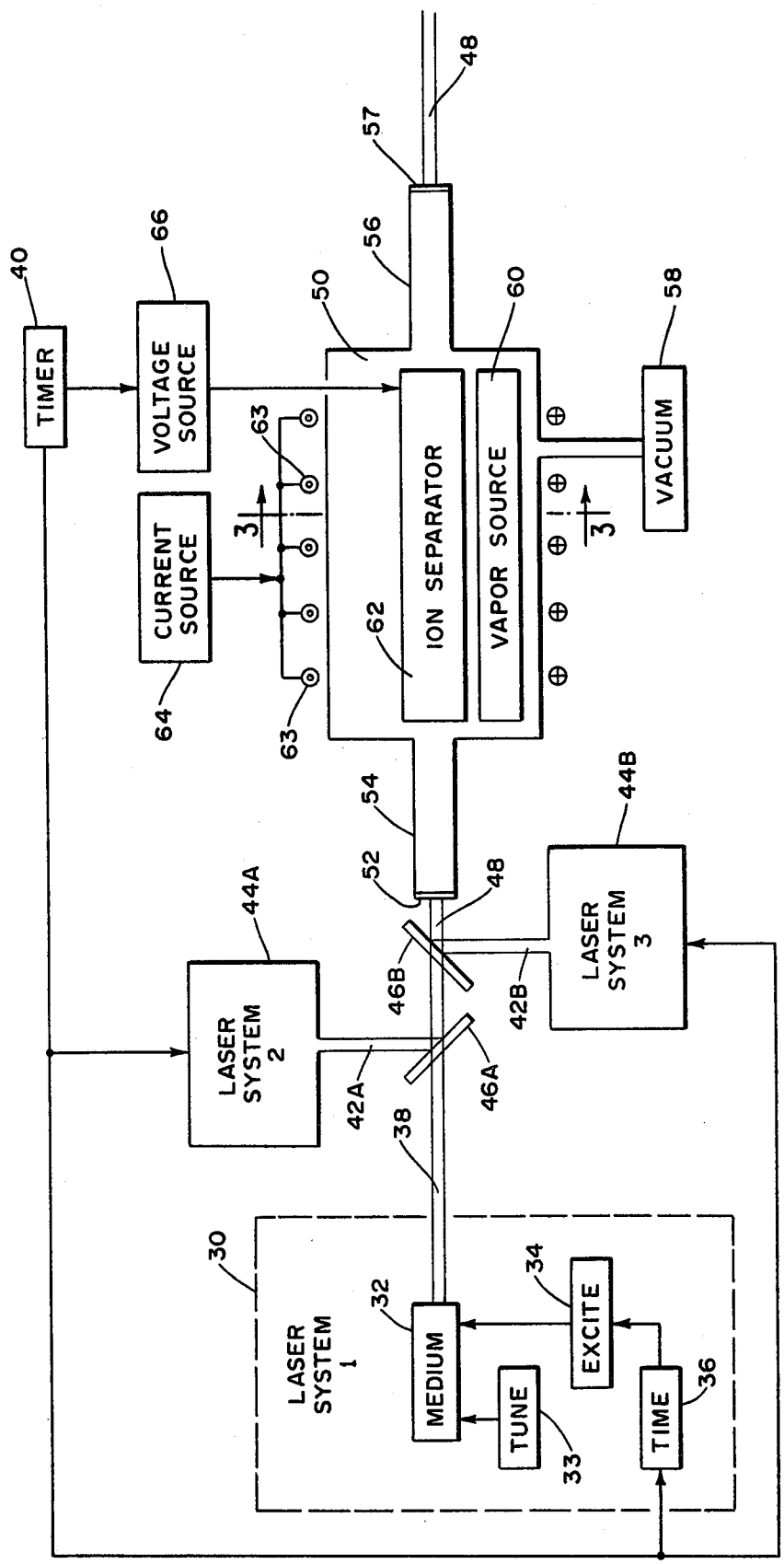
FIG. 2 is a system diagram of apparatus for practicing the invention.

In order to further explain the method and apparatus of the present invention, reference will now be had to FIG. 2 which illustrates a system in which the technique of the present invention may be utilized. In particular, laser system 30 is shown having a lasing medium 32 and associated tuning elements 34 which may include a laser cavity and associated frequency limiting elements such as prisms, etalon filters or difraction gratings. The medium 32 is excited to a lasing condition by an excitation system 34 which may typically include another laser or flashlamp. The exciter 34 is activated by a timing system 36 to initiate the application of excitation radiant energy to the medium 32 to produce the population inversion for lasing. The laser system 30 may include a Dial-A-Line laser of the Avco Everett Research Laboratory, Everett, Massachusetts, with, as found desirable, additional bandwidth narrowing elements such as etalon filters to define the frequency output of the medium 32 in a laser beam 38 at a frequency for encompassing an absorption line for the U-235 isotope of uranium without substantially encompassing an absorption line for other isotope types, such as the U-238 isotope. One or more stages of amplification may be applied to the laser beam 38 as desired in order to boost its output to up to hundreds of millejoules in each pulse of radiation. Ten millejoules/cm$^2$ is a preferred flux density but somewhat lower densities may be employed. Pulse rates up to 50 KHz may be used, it being desired to illuminate all atoms in the vapor flow. For high rates, arrays of lasers with prism combining optics may be used. See for example U.S. patent application Ser. No. 438,029, filed Jan. 30, 1974, incorporated herein by reference.

For preferred application, the pulses of radiation in the beam 38 continue for a substantial fraction of a microsecond, though durations as low as a few nanoseconds have been satisfactorily utilized. Longer periods may be used if the excited state lifetimes are correspondingly longer. The initiation of each pulse by the timer circuit 36 is triggered by a signal from a timer 40.

The laser radiation in beam 38 is combined with laser radiation in beams 42A and 42B from second and third laser systems 44A and 44B in the preferred embodiment, using, for example, dichroic mirros 46A and 46B. Other combining systems such as prisms may be utilized in accordance with the user's preference. The combined radiations form a beam 48 of laser radiation in which, typically, the pulses occur simultaneously, although it may be possible to provide the radiation for the higher level transitions a few nanoseconds subsequent to the radiation for the lower lying transitions.

In one exemplary embodiment of this invention, the radiation in beam 38 is tuned to a U-235 absorption line in the red, while the radiation in beams 42A and 42B are tuned to absorption lines in the red-orange. The radiation energy densities in the beams 38 and 42 may typically be approximately the same, or varied somewhat in accordance with the different absorption cross-sections for the transitions that they are to produce.

The radiation in the combined beam 48 is applied to an evacuated chamber 50 through typically an optical quartz window 52 on a pipe extension 54 which places the window 52 at a distance from contaminating vapors in the chamber 50. The radiation in beam 48 will traverse the chamber 50 and exit through a similar pipe 56 and window 57 for typical application to additional chambers similar to chamber 50. Before leaving the chamber 50, the radiation in beam 48 may make plural passes through the chamber 50 for purposes described below.

Within the chamber 50, a low pressure of approximately 10$^{-5}$ torr during operation is maintained by a vacuum pump system 58. A vapor source 60 is provided which generates a uranium vapor flow upward toward an ion separator 62. The vapor density may range between approximately 1 × 10$^{13}$ to 1 × 10$^{14}$ atoms/cc but is not so limited. Within the chamber 50, a magnetic field substantially coaxial to the laser beam 48 is provided by plural coils 62 wound about the chamber 50 and excited with a current by a source 64. The magnetic field intensity within the chamber 50, particularly in the region of the ion separator 62 may be in the range of several hundred gauss (e.g. 100–300 gauss) as typical field strengths. An orthogonal electric field is produced in pulses, preferably directly following each pulse of laser radiant energy in the beam 48, by a signal from a voltage source 66 which is, in turn, activated by a signal from the timer 40. Typical pulse durations for the electric field range from one to a few microseconds, and field strengths of approximately 20–100 volts/cm, typically 30 volts/cm may be employed. The magnetic and electric field strengths and the pulse duration are provided to accelerate ionized uranium vapor particles onto distinct trajectories before substantial charge exchange.

Figure 3:
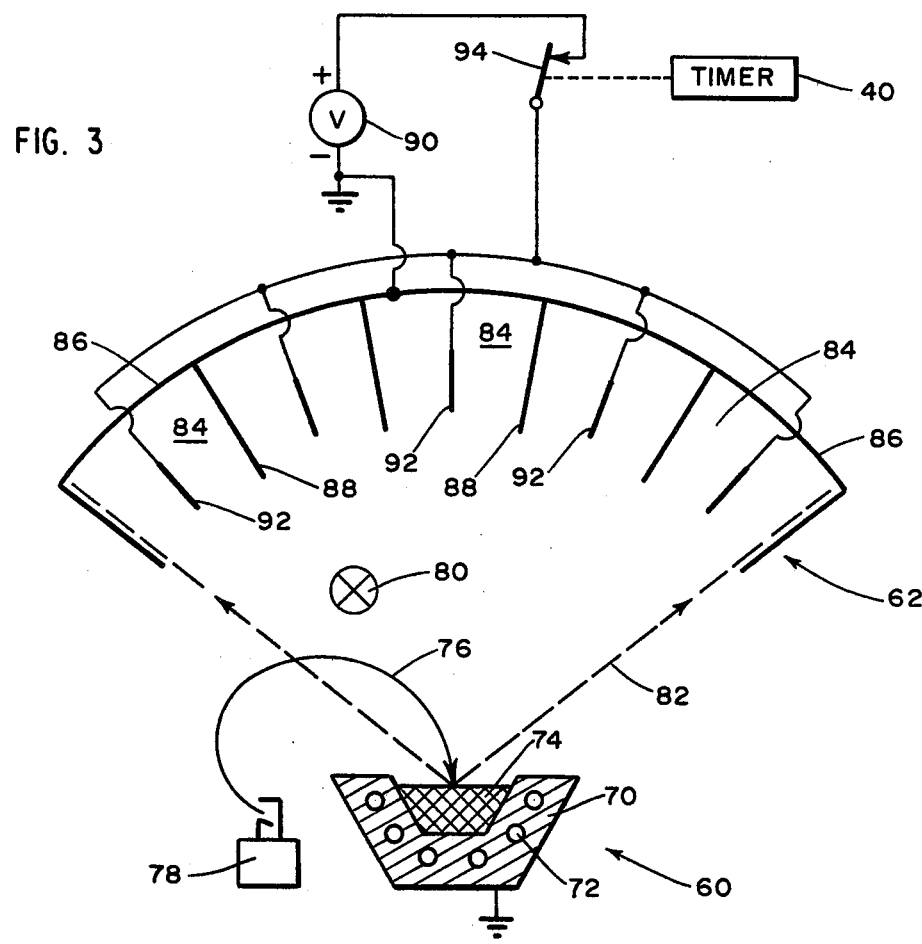
FIG. 3 is an internal view of a section of a portion of the apparatus of FIG. 2.

The details of the chamber 50 as they relate to the practice of the present invention are more fully illustrated in FIG. 3 which is a sectional view of the interior of the chamber 50 along the section lines indicated in FIG. 2. In FIG. 3, the vapor source 60 is illustrated as including a crucible 70 having a plurality of cooling ports 72 for, typically, water, and containing within the crucible 70 a supply 74 of elemental uranium metal. Vaporization of the uranium supply 74 may be achieved by any form found convenient, though the preferred form for vaporization is to apply an electron beam 76 in a line along the surface of the supply 74, or optionally a series of spots. The electron beam 76 is generated by a filamentary source 78 and focused by a magnetic field 80 produced by current in the coils 62. The heating of a long line on the surface of the supply 74 produces a radially expanding vapor flow 82 of uranium metal having isotopic components in essentially the same portions as they occur in the supply 74. The vapor flow 82 has, it is believed, a nearly cosine distribution in its density. The vapor flow rate is typically 40 grams per hour for each centimeter of length along the surface of the supply 74. A typical length for the crucible 70 in the direction of field 80 is one meter.

The ion separator 62 includes a set of electrodes placed to define a plurality of chambers 84 at approximately 10 centimeters from the crucible 70. The chambers 84 are defined by a rear, tails, collection plate 86 which forms a cylindrical section, and inwardly, radially extending, electrodes 88 of approximately 5.0 centimeters in length. The plates 88 are electrically connected to the rear plate 86 and connected to one terminal, preferably negative, of a voltage source 90. Within each chamber 88, a central, electrode 92 is placed and each electrode 92 is connected in common to the other, positive, terminal of voltage source 90 through a switch 94. Switch 94 is activated by the timer 40 to provide each pulse of electric field. The potential of voltage source 90 may typically be 60 volts. Each of the plates 88 and 86 and the radial electrode 92 extend into and out of the page of FIG. 3 the length of the ion separator, typically a meter or longer, as shown in FIG. 2.

In operation, the uranium vapor flow 82 will have a number of components, including a large number of electrons. Two principle electron sources include the vapor source due to equilibrium conditions of a vaporization and the e-beam.

The release of electrons by the vapor source is a function of temperature as described by the Saha equation. The electrons are released as electron ion pairs which preserve charge neturality in the vapor flow and permit them to travel with the flow to be available for impact ionization. The electron particles will experience random collisions with each other and with atoms of the uranium in the vapor flow 82. These collisions and the energy exchanged will be a continuing process, and, along with other causes, result in the population of some lower lying energy states for the uranium isotopes in the vapor flow 82. It may accordingly be desired to laser irradiate for an initial transition not only from the ground energy level but from one or more lower lying energy levels. The laser radiation is applied to the region of the chambers 84, and by reflections of the beam back and forth through the ion separator 62 from prisms not shown illuminates all chambers 84. The beam 48 for this purpose is typically 2cm × 2.5cm in cross-section.

Laser radiation applied in accordance with the various radiation criteria described above will be operative to produce photoexcitation of the U-235 isotope in the vapor flow 82 to the energy range of levels 12 which preferably are the Rydberg levels, a small fraction of an electron volt below the ionization level 14. This range is typically 0.03 ev below ionization as mentioned above.

Selection of specific wavelengths for the laser systems 30 and 44 is preferably based on available dye laser frequencies of lasing such as the red and orange regions of the visible spectrum. Additionally, it is desired to provide a wavelength for at least the first transition, such as step 18, which exhibits a good isotope shift, or separation between the absorption lines for the U-235 isotope with respect to other isotopes. It is preferable to provide isotopic selectivity in the other steps as well. Also, a relatively large absorption cross-section for the transitions between excited states is desired as well as a lifetime in the excited state which is long with respect to laser pulse duration.

An enormous number of wavelengths exist for which uranium has an absorption line and which satisfy these criteria to varying degrees. When constructing and operating a system of the type described above appropriate wavelengths may be selected within the individual limitations of the laser systems employed by known spectrographic analysis. Absorption lines are detected by tuning the laser radiation, starting with the first transition laser, over a range of absorption lines, preferably in the red or red-orange as described above. From spectrographic observation, a frequency at an observed U-235 absorption is selected in accordance with the degree to which the observed lines satisfies the criteria above.

At the point where highly excited atoms have been created, the random energy transfer by particle collisions, typically with electrons, will be sufficient to produce an efficient, significant rate of ionization of the U-235 isotope particles from the level in range 12 without the necessity for providing a high intensity ionizing radiation to overcome the relatively small ionization absorption cross-section. Particles other than electrons such as U-235 and U-238 atoms or mixtures thereof may be used for the same effect.

After ionization, the crossed-field magnetohydrodynamic acceleration forces produced within the chambers 84 by each pulse of electric field from source 90 achieves an acceleration of the U-235 ions toward electrodes 88 for collection in concentrations substantially greater than in the uranium vapor flow 82. The enriched uranium on the electrodes 88 may be periodically collected for processing in a useable form by known techniques.

Having described above a preferred embodiment for the present invention, it will occur to those skilled in the art that modifications and alternatives to the disclosed technique may be employed within the spirit of the invention. It is accordingly intended to define the invention only in accordance with the limitations of the following claims.

What is claimed is:

1. A method for ionizing particles of one isotope type in an environment of plural isotope type particles comprising the steps of:
    generating a vapor environment of particles of said plural isotope types, said vapor environment generating step including the step of generating energetic electron particles;
    exciting the particles of said one isotope type to an excited state which is below the ionization level of the particles of said one isotope type by a small fraction of the ionization potential of said one isotope type;
    the excitation of the particles of said one isotope type being isotopically selective with respect to that one isotope type so as not to correspondingly excite particles of other isotope types in said environment;
    the excitation of the particles of said one isotope type being to an energy level from which ionization occurs in response to collision between the particles of said one isotope type and the energetic electron particles of said environment.

2. The method of claim 1 further including the step of separating the particles of said environment ionized by particle collision.

3. The method of claim 2 wherein said separating step further includes the step of accelerating the particles of said environment ionized in response to collision with said energetic particles, the acceleration being onto a direction to permit separate collection thereof apart from the other particles of said environment.

4. The method of claim 3 wherein the accelerated particles are collected on a surface.

5. The method of claim 1 wherein said step of generating said environment further includes the step of vaporizing a material which includes said plural isotope type particles to produce a vapor flow of said material which defines said environment.

6. The method of claim 5 further including the step of providing further energetic particles in said vapor environment.

7. The method of claim 5 wherein said material includes uranium.

8. The method of claim 7 wherein the vapor density of uranium atoms at points of excitation is approximately between $1 \times 10^{13}$ and $1 \times 10^{14}$ atoms per cc.

9. The method of claim 1 wherein the excited energy level to which the particles of said one isotope type are excited for collisional ionization is below the ionization level for said particles by a small fraction of an electron volt.

10. The method of claim 9 wherein said small fraction is approximately 0.03 ev.

11. The method of claim 10 wherein said excited energy level includes a Rydberg level.

12. The method of claim 1 wherein said step of generating said environment includes the step of providing an environment wherein the rate of ionizing particle collisions between the excited particles of said one isotope type and said energetic particles exceeds the decay rate of excited particles of said one isotope type from the level below ionization to which they are excited.

13. The method of claim 1 wherein said environment is in a region of approximately $10^{-5}$ torr pressure.

14. The method of claim 1 further including the step of applying electric and magnetic fields to the environment of particles containing particles of said one isotope type collisionally ionized by impact with said energetic particles to produce an acceleration on the ionized particles in said environment.

15. The method of claim 14 wherein said electric and magnetic fields are applied to produce pulsed acceleration in the charged particles in said environment.

16. The method of claim 1 wherein said step of exciting the particles of said one isotope type includes the step of applying radiant energy having at least three wavelengths, said radiant energy having a sufficiently narrow bandwidth in at least one wavelength thereof to excite the particles of said one isotope type without exciting particles of other isotope types in said environment.

17. The method of claim 16 wherein the three wavelengths lie in approximately the red and red-orange spectral regions.

18. A method for selectively ionizing atoms of one uranium isotope type without corresponding ionization of other uranium isotope types comprising the steps of:
 evaporating uranium metal to provide a uranium vapor flow;
 the uranium vaporization step providing a supply of electron ion pairs in the uranium vapor which generally maintains a charge neutrality condition in said vapor flow permitting the electrons thereby produced to flow with said vapor;
 applying at least two wavelengths of laser radiation in pulses of at least 1.0 millijoules per $cm^2$ total pulse energy density with at least one wavelength having isotopic selectivity in its photon energies to produce excitation of the one uranium isotope without corresponding excitation of other isotope components of said vapor flow;
 the laser radiation for said two wavelengths lying generally in the visible spectral region and being of photon energies which produce a total excitation of the one uranium isotope type atoms to a Rydberg level of excitation which is a small fraction of an electron volt below the ionization level for said one uranium isotope;
 the step of generating said vapor including the step of providing the electrons in said vapor flow with sufficient energy to collisionally ionize the atoms of said one uranium isotope from the excited, Rydberg levels.

19. The method of claim 18 wherein said vapor generating step includes applying an electron beam to a surface of said uranium metal.

20. The method of claim 19 wherein said laser radiation includes a wavelength in the red and two wavelengths in the red-orange spectral regions.

21. The method of claim 20 wherein said Rydberg level is approximately 6.16 ev above the ground state for atoms of said one isotope type.

22. In a process for separating the uranium U-235 isotope from a uranium isotope mixture by selectively photo-exciting U-235 atoms in a generated vapor environment comprising both U-235 and U-238 atoms, the improvement which comprises the steps of:
 generating a supply of energetic electron particles in said vapor environment as a result of the generation of the U-235 and U-238 atoms;
 controlling the excitation energy so as to selectively excite U-235 atoms in said vapor environment without correspondingly exciting as proportionately large a portion of the U-238 atoms in said vapor environment to a Rydberg energy level closely approaching but below the ionization potential of the U-235 atoms in said vapor environment, said Rydberg energy level being one from which electron collisional ionization may be produced; and
 ionizing the excited U-235 atoms by collisional ionization thereof with said energetic electron particles in said vapor environment.

23. The process in accordance with claim 22 wherein the U-235 is excited to an energy level approximately 0.03 ev below the ionization level.

24. The process in accordance with claim 22 wherein a pressure of approximately $10^{-5}$ torr is maintained in the region surrounding said vapor environment, and the uranium vapor is generated along a line at a rate of approximately 40 grams per centimeter of line dimension per hour.

25. The process in accordance with claim 24 wherein the uranium vapor density is in the range of approximately $1 \times 10^{+13}$ to $1 \times 10^{+14}$ atoms per cc in the region of photoexcitation.

26. The process in accordance with claim 22 wherein the U-235 atoms are selectively photoexcited by illumination with at least three laser beams, at least one laser beam being tuned in the red spectral region and at least two other laser beams being tuned in the red-orange spectral region.

27. The process in accordance with claim 26 wherein the laser beams are pulsed with an intensity of approximately 1.0 to 10 millejoules per $cm^2$ per pulse.

28. The process in accordance with claim 27 wherein:
 the vapor environment includes a vapor flow; and
 the pulse repetition rate is sufficient to illuminate approximately all portions of the uranium atoms in the vapor flow.

29. The process in accordance with claim 28 further including the step of accelerating the collisionally ionized particles onto trajectories distinct from said vapor flow.

30. Apparatus for ionizing particles of one isotope type in an environment of plural isotope type particles comprising:
 means for generating a vapor environment of particles of said plural isotope types, said generating means including means for generating energetic electron particles;
 means for exciting the particles of said one isotope type to an excited state which is below the ionization level of the particles of said one isotope type by a small fraction of the ionization potential of said one isotope type;
 the excitation of the particles of said one isotope type being isotopically selective with respect to that one isotope type so as not to correspondingly excite particles of other isotope types in said environment;
 the excitation of the particles of said one isotope type being to an energy level from which ionization occurs in response to collision between the particles of said one isotope type and the energetic electron particles of said environment.

31. The apparatus of claim 30 further including means for separating the particles of said environment ionized by particle collision.

32. The apparatus of claim 30 wherein said means for generating said environment is operative to vaporize a material which includes said plural isotope type particles to produce a vapor flow of said material which defines said environment.

33. The apparatus of claim 30 further including means for providing further energetic particles.

34. The apparatus of claim 33 wherein said material includes uranium.

35. The apparatus of claim 30 wherein the excited energy level to which the particles of said one isotope type are excited for collisional ionization is below the ionization level for said particles by approximately 0.03 electron volt.

36. The apparatus of claim 30 further including means for applying electric and magnetic fields to the environment of particles containing particles of said one isotope type collisionally ionized by impact with said energetic particles to produce pulses of acceleration on the ionized particles in said environment.

37. The apparatus of claim 30 wherein said means for exciting the particles of said one isotope type includes means for applying radiant energy having at least three wavelengths, said radiant energy having a sufficiently narrow bandwidth in at least one wavelength thereof to excite the particles of said one isotope type without exciting particles of other isotope types in said environment.

38. The apparatus of claim 37 wherein the three wavelengths lie in approximately the red and red-orange spectral regions.

39. Apparatus for selectively ionizing atoms of one uranium isotope type without corresponding ionization of other uranium types comprising:

means for evaporating uranium metal to provide a uranium vapor flow;

the uranium vaporization means including means for providing a supply of electron ion pairs in the uranium vapor which generally maintain a charge neutrality condition in said vapor flow permitting the electrons thereby produced to flow with said vapor;

means for applying at least two wavelengths of laser radiation in pulses of at least 1.0 millejoules per $cm^2$ total pulse energy density with at least one wavelength having isotopic selectivity in its photon energies to produce excitation of the one uranium isotope type without corresponding excitation of other isotope components of said vapor flow;

the laser radiation for said at least two wavelengths lying generally in the visible spectral region and being of photon energies which produce a total excitation of the one uranium isotope type atoms to a Rydberg level of excitation which is a small fraction of an electron volt below the ionization level for said one uranium isotope;

the electrons generated in said vapor flow having an energy which produces collisional ionization of the atoms of said one uranium isotope at the excited isotope Rydberg level.

* * * * *